United States Patent [19]

Etsusaki et al.

[11] 4,273,196
[45] Jun. 16, 1981

[54] AUTOMATIC CONTROL SYSTEM FOR MAINTAINING BLADE IN PREDETERMINED RELATIONSHIP TO LASER BEAM

[75] Inventors: Yuji Etsusaki; Shunichi Hayakawa, both of Hiratsuka, Japan

[73] Assignee: Kabushiki Kaisha Komatsu Seisakusho, Tokyo, Japan

[21] Appl. No.: 38,318

[22] Filed: May 11, 1979

[30] Foreign Application Priority Data

May 16, 1978 [JP] Japan ............... 53/57887

[51] Int. Cl.³ ................ E02F 3/76; E02F 3/85
[52] U.S. Cl. .................. 172/4.5; 37/DIG. 20; 250/203 R
[58] Field of Search ............ 172/2, 4, 4.5; 37/DIG. 1, DIG. 19, DIG. 20; 404/84; 56/10.2; 250/203 R, 203 CT; 356/72, 400

[56] References Cited

U.S. PATENT DOCUMENTS

| | | | |
|---|---|---|---|
| 2,924,768 | 2/1960 | Farrand et al. | 250/203 R X |
| 3,887,012 | 6/1975 | Scholl et al. | 172/4.5 |
| 3,931,515 | 1/1976 | Parkin | 250/203 R X |
| 4,157,118 | 6/1979 | Suganami et al. | 172/4.5 |
| 4,162,708 | 7/1979 | Johnson | 37/DIG. 20 |

FOREIGN PATENT DOCUMENTS 382793  7/1976  U.S.S.R. .............. 37/DIG. 20

*Primary Examiner*—Richard T. Stouffer
*Attorney, Agent, or Firm*—Spensley, Horn, Jubas & Lubitz

[57] ABSTRACT

A beam receiver secured to an upper portion of a blade of an earth working equipment can rotate in a horizontal plane and move in a vertical direction and, accordingly, can catch a laser beam from a beam projector regardless of a direction of the equipment. When the beam has been deviated out of the beam receiver, the direction of the deviation is detected so that the beam can be received by the beam receiver again. The height of the beam receiver relative to the blade can be adjusted and the level of the blade can thereby be controlled very accurately.

6 Claims, 17 Drawing Figures

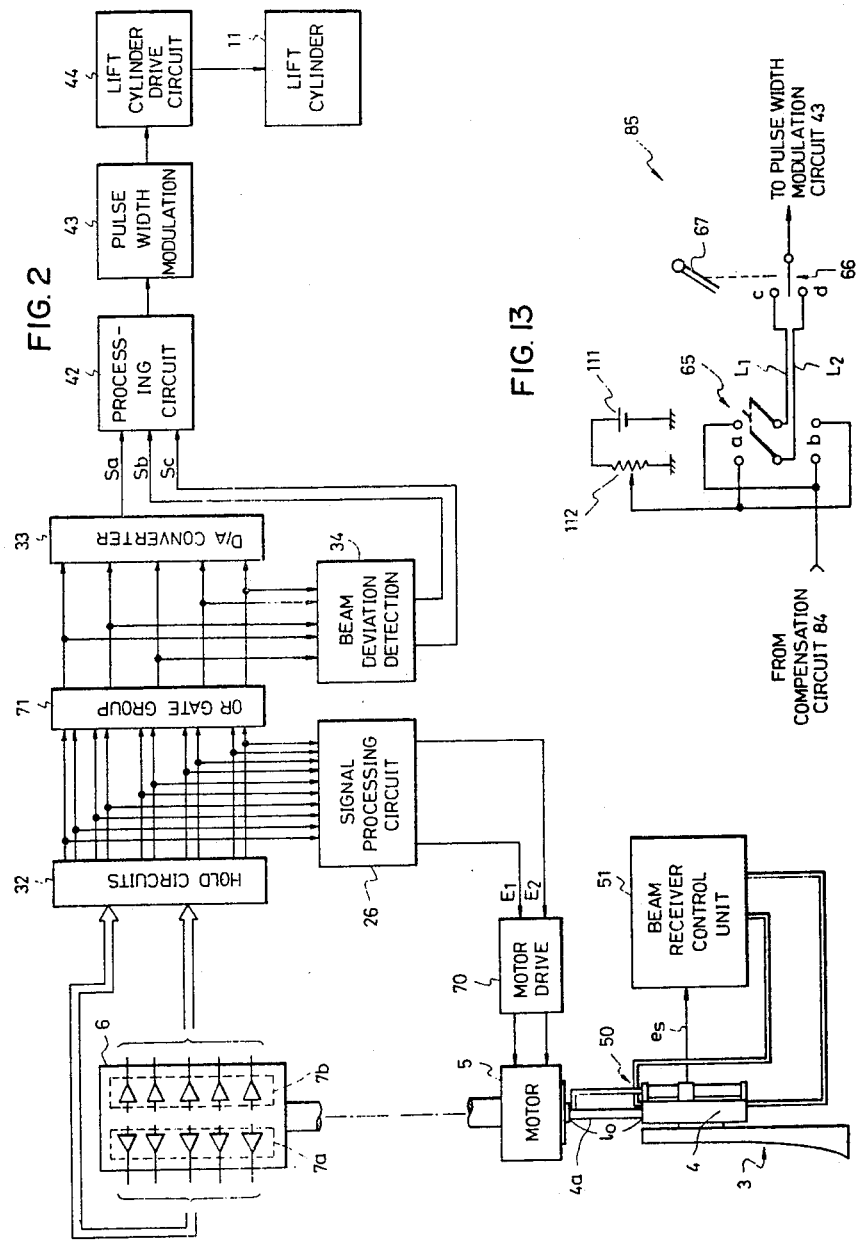

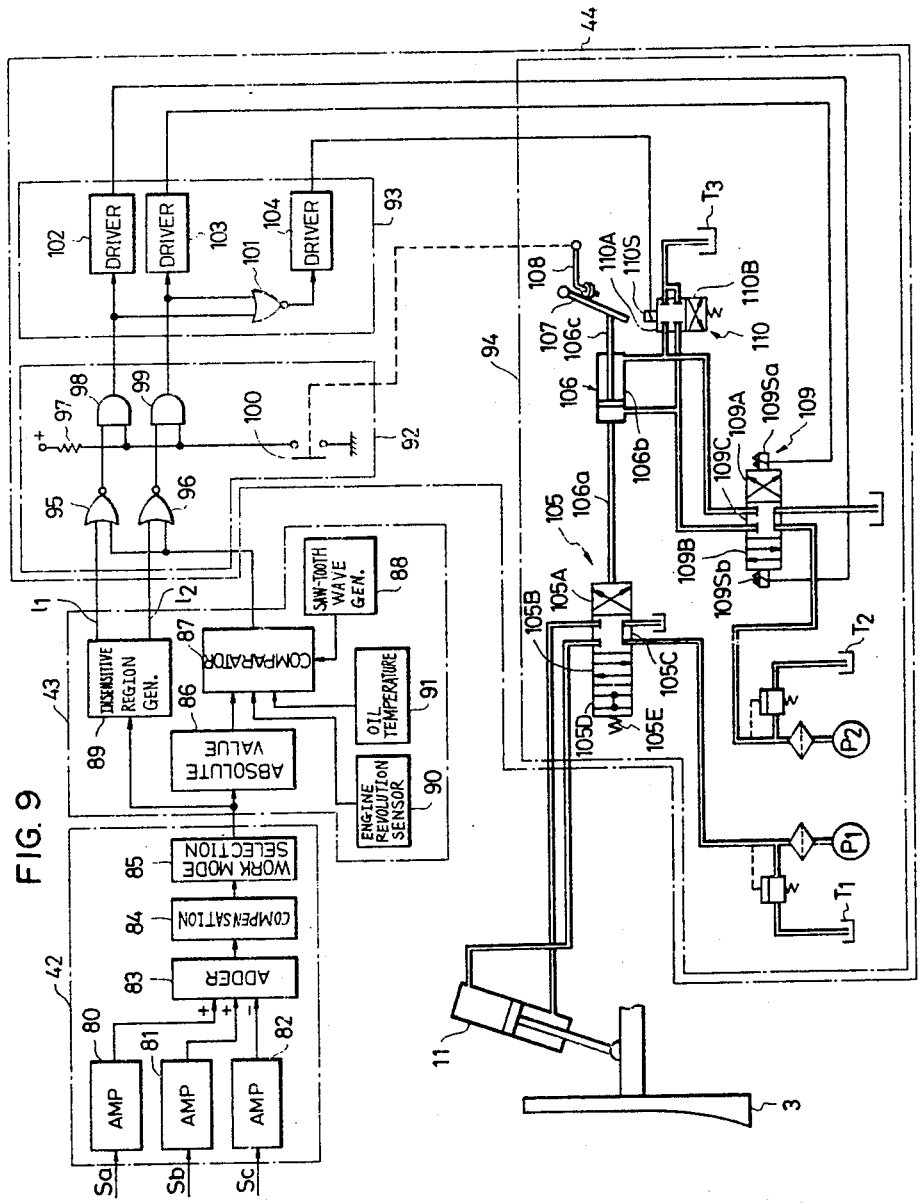

AUTOMATIC CONTROL SYSTEM FOR MAINTAINING BLADE IN PREDETERMINED RELATIONSHIP TO LASER BEAM

BACKGROUND AND SUMMARY OF THE INVENTION

This invention relates to an apparatus for automatically controlling a blade of earth working equipment such as a bulldozer.

The following proposals have been made in the art of automatic controlling of blades of earth working equipment:

1. The specification of U.S. Pat. No. 2,796,685 discloses a method for controlling a position of a construction equipment by forming parallel radiation energy planes and automatically controlling the position of the equipment in accordance with deviation from the energy planes.

2. The specification of U.S. Pat. No. 2,916,836 discloses a method according to which a reference plane is formed by rotating a visible radiation source and detecting light by a light receiving device attached to a blade for controlling the blade by means of a motor or a hydraulic system using an electromagnetic valve.

It will be difficult to achieve the control as described in the patent by this method in view of the response speed realized by this method, for the light source is a lamp and the light receiver can detect only a vertical position.

3. The specification of U.S. Pat. No. 3,000,121 discloses a system for automatically controlling a blade of a construction equipment in a vertical direction in which a reference plane is formed by a light beam and a light receiver is provided for detecting whether the center of the light receiver coincides with the center of the reference light beam and emitting a signal of a different polarity depending upon whether the center of the reference light beam is above or below the center of the light receiver.

4. The specification of U.S. Pat. No. 3,887,012 discloses a circuit for controlling an earth working equipment which, in a device having a certain relation with a plane formed by narrow rotating beam of radiant energy of a fixed wavelength, a receiver has at least three channels and a light receiving element cathodes a light beam incident from all directions within 180° or 360° thereby to control the earth working equipment so that the light receiving element catches the light beam at its center.

The proposed circuit is mainly directed to the control of a motor grader and is not convenient for application to a bulldozer in which light beams may enter two channels simultaneously.

5. There has also been proposed a device which, in an apparatus for detecting height of a laser beam emitted from the laser emitter by a beam receiver and controlling a blade by driving an electromagnetic valve, prevents stopping of an engine when an excessive load is applied.

It is an object of the invention to provide a control apparatus capable by controlling lifting, lowering and turning of the beam receiver effectively and enabling the beam receiver to face the beam projector directly regardless of direction of the equipment.

It is another object of the invention to provide a control apparatus in which even if a laser beam is deviated from the beam receiver, the deviation is promptly corrected so that the beam receiver can catch the laser beam again.

It is still another object of the invention to provide a control apparatus in which height of the beam receiver relative to the blade can be adjusted so that the level of the blade can be controlled very accurately.

BRIEF DESCRIPTION OF THE DRAWINGS

In the drawings,

FIG. 2 is a block diagram showing an example of a control system employed in the embodiment shown in FIG. 1;

FIG. 9 is a block diagram showing an example of blade control made in response to a detection signal from the beam deviation detection circuit;

FIG. 13 is a block diagram showing an example of a system for switching carrying out and stopping of an earth grading operation in accordance with forward and reverse movements of the earth working equipment;

DESCRIPTION OF A PREFERRED EMBODIMENT

Figure 1:
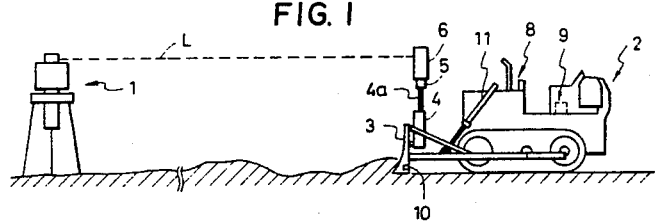
FIG. 1 is a side view schematically showing an embodiment of the present invention.

Referring first to FIGS. 1 and 2, structure and operation of a preferred embodiment of the invention will be described.

In FIG. 1 a laser beam projector 1 is located at a suitable position on the working ground. The laser beam projector 1 projects a laser beam L of a reference height rotatably in a horizontal plane or a plane of a desired inclination.

A bulldozer 2 which is shown by way of example of an earth working equipment has a vertical cylinder 4 secured rigidly to the back of a blade 3. A tracing motor 5 is secured to an upper and portion of a rod 4a of the cylinder 4 and a beam receiver 6 is mounted on a rotating shaft of the tracing motor 5. The beam receiver 6 has a plurality of beam receiving elements (not shown) arranged in a vertical direction for outputting a beam height detection signal which is of a polarity and value corresponding to a position at which the laser beam L is received. The detection signal outputted from the beam receiver 6 is processed by a controller 8 for actuating an electromagnetic valve (not shown) in a valve box 9 thereby to contract and expand a lift cylinder 11. This causes the blade 3 to be lifted and lowered so as to adjust the beam receiving position of the beam receiver 6 to a center of the beam receiver 6.

The cylinder 4 is used for adjusting the height of the receiver 6 and thereby setting the level of the blade 3 in an actual work.

The above described detection signal is used also as a tracing signal for always directing the beam receiver 6 toward the laser beam projector 1. Since the magnitude of the detection signal differs depending upon an angle at which the beam receiver 6 receives the beam and becomes the largest when the beam receiver 6 confronts the projector 1 even if the beam receiving height remains unchanged, the position of the beam receiver 6 is controlled so as to maintain the value of the detection signal at a maximum by utilizing the detection signal as a tracing signal. The signal from the beam receiver 6 to be used as the tracing signal is processed in the controller 8 and thereafter is used to drive the tracing motor 5 to turn the beam receiver 6 always to the beam projector 1.

An inclinometer 10 mounted on the blade 3 detects a tilt angle of the blade 3, i.e., an angle of inclination of the blade 3 in the longitudinal direction of the blade 3 relative to a horizontal plane, by utilizing gravity. A tilt angle detection signal from the inclinometer 10 is processed by an arithmetic unit provided in the controller 8 and thereafter is supplied to the electromagnetic valve in the valve box 9 to actuate the valve and thereby drive a tilt cylinder (not shown). The tilt angle of the blade 3 thereby is controlled so that it will maintain a predetermined angle.

FIG. 2 schematically shows a control system employed for controlling the embodiment shown in FIG. 1. In FIG. 2, the beam receiver 6 is shown as a front view. In the beam receiver 6, two lines of beam receiving element groups 7a and 7b are provided. In each of the groups 7a and 7b, plurality of beam receiving elements are vertically arranged and a signal is outputted from one of these beam receiving elements which has caught the laser beam L. The beam receipt signals from the beam receiving element groups 7a and 7b are held for a predetermined short duration of time by a hold circuit group 32.

A beam receipt signal tracing signal processing circuit 26 produces, responsive to the signal held by the hold circuit 32, a signal for controlling the direction of the beam receiver 6 so as to confront it against the beam projector 1. The signal from this processing circuit 26 is applied to the tracing motor 5 via a motor driving circuit 70 to drive the motor 5 and thereby control the direction of the beam receiver 6.

The signal held by the hold circuit 32 is applied to the OR gate group 71. The OR gate group 71 has 2-input OR gates of a number corresponding to the stages of the beam receiving elements in the beam receiver 6, each OR gate receiving beam receipt signals from the left and right beam receiving elements in a corresponding stage. If, accordingly, either one of the left and right beam receiving elements receives the laser beam L, the beam receipt signal is outputted from a corresponding one of the OR gates. The output signal of the OR gate group 71 is applied to a digital-to-analog converter 33 which thereupon produces an analog signal Sa of magnitude corresponding to the beam receiving element which has received the laser beam L, i.e. corresponding to the height at which the beam receiver 6 has received the laser beam L. The output signal of the OR gate group 71 is applied also to a beam deviation detection circuit 34. This beam deviation detection circuit 34 is provided for detecting deviation of the laser beam L from the beam receiver 6. The circuit 34 provides a signal Sb when the beam has been deviated upwardly out of the beam receiver and a signal Sc when it has deviated downwardly out of the beam receiver.

The signal Sa from the digital-to-analog converter 33 and the signals Sb and Sc outputted from the beam deviation detection circuit 34 are used for controlling the height of the blade 3.

A processing circuit 42 inputs the signals Sa, Sb and Sc and produces a signal corresponding to an amount of correction in the level of the blade required. When the laser beam L is not deviated from the beam receiver 6, the processing circuit 42 outputs an output corresponding to the level signal Sa whereas when the laser beam L is deviated from the beam receiver 6, the processing circuit 42 outputs an output corresponding to the signals Sb and Sc. If, for example, the signal Sb is "1" (i.e., the beam is deviated upwardly), the processing circuit 42 may output a signal which is of a positive polarity and of a value greater than a value obtainable by the uppermost beam receiving element. If the signal Sc is "1" (i.e., the beam is deviated downwardly), the processing circuit 42 may output a signal which is of a negative polarity and of a value greater than a value obtainable by the lowermost beam receiving element. A pulse width modulation circuit 43 receives the output of the processing circuit 42 as its input and outputs a pulse signal having a polarity corresponding to this input and a pulse width corresponding to the magnitude of the input. This pulse signal is applied to an electromagnetic valve incorporated into lift cylinder drive circuit 44 to drive the electromagnetic valve in the direction corresponding to the polarity and during time corresponding to the pulse width. The lift cylinder 11 thereby is contracted or expanded to control the blade 3 so that the beam receiving position of the beam receiver 6 will coincide with the center of the beam receiver 6. The processing circuit 42 and the pulse width modulation circuit 43 are provided in the controller 8 and the electromagnetic valve of the lift cylinder drive circuit 44 is provided in the valve box 9.

In FIG. 2, a beam receiver height control circuit 51 is provided for adjusting the height of the beam receiver 6 so as to set a finishing level (i.e. the height of the blade).

Main component elements among the component elements described above will now be described in detail.

Figure 3A:
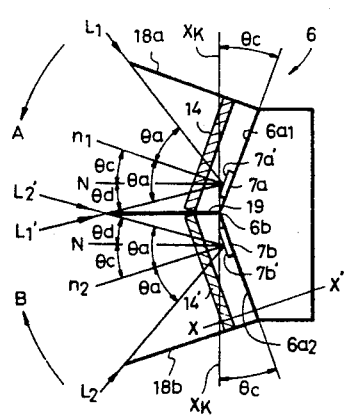
FIG. 3(a) is a plan view schematically showing an example of a beam receiver shown in FIG. 1.
Figure 3B:
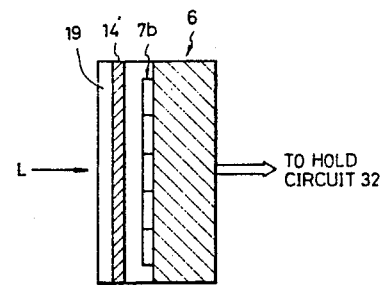
FIG. 3(b) is a sectional side view of the example of the beam receiver shown in FIG. 3(a)

The beam receiver 6 is constructed in a manner shown in FIGS. 3(a) and 3(b). FIG. 3(a) is a plan view of the beam receiver 6 and FIG. 3(b) is a sectional side view thereof cut along line X=X' in FIG. 3(b).

As shown in FIG. 3(b), the beam receiver 6 has two lines of the beam receiving element groups 7a and 7b directing outwardly relative to each other. This arrangement is employed for obtaining a large scope of tracing.

Front surfaces $6a_1$ and $6a_2$ of the beam receiver 6 are inclined by an angle $\theta c$ with respect to a plane $X_k$ passing a central portion $6b$. Hoods $18a$ and $18b$ are provided on both sides of the beam receiver 6 in such a manner that these hoods $18a$ and $18b$ will project from the outer ends of the front surfaces $6a_1$ and $6a_2$ at about right angles with the front surfaces $6a_1$ and $6a_2$. A projecting support plate 19 is provided on the central portion.

Figure 4:
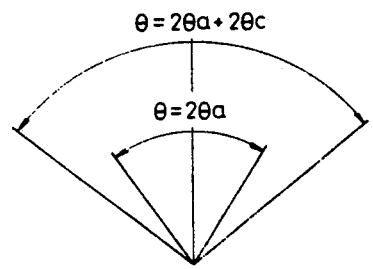
FIG. 4 is a diagram showing a range of receiving beam by the beam receiver shown in FIGS. 3(a) and 3(b)
Figure 5:
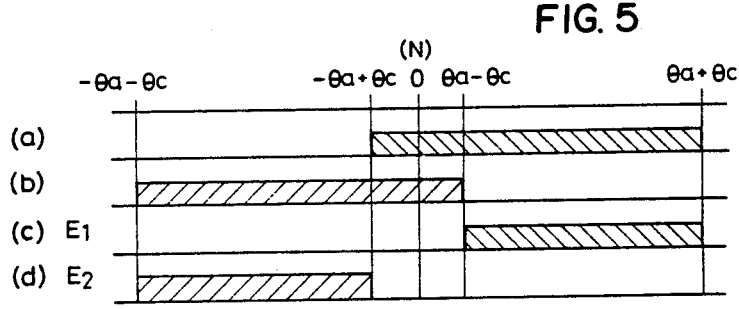
FIG. 5 is a diagram for explaining the operation of the beam receiver shown in FIGS. 3(a) and 3(b)

Beam receiving element groups $7a$ and $7b$ are arranged at predetermined positions near the central portion $6b$ on the front surfaces $6a_1$ and $6a_2$ with beam receiving planes $7a'$ and $7b'$ extending parallel to the front surfaces $6a_1$ and $6a_2$. Accordingly, normal lines $n_1$ and $n_2$ of the beam receiving element groups $7a$ and $7b$ are inclined by an angle $\theta c$ with respect to a front direction N. These beam receiving element groups $7a$ and $7b$ have a beam receivable angle $\pm \theta a$. The inclination angle $\partial c$ is set at a smaller angle than the beam receivable angle $\theta a$. Accordingly, the beam receiving element group $7a$ can detect beams $L_1-L_1'$ incident within an incident angle of $\theta a+\theta c$ to $-\theta a+\theta c$ ($\theta c-\theta a=\theta d$) with respect to the front direction N as shown in FIG. 3(a) and FIG. 5(a). The beam receiving element group $7b$ can detect means $L_2-L_2'$ incident within an incident angle of $-\theta a-\theta c$ to $\theta a-\theta c$ with respect to the front direction N as shown in FIG. 3(a) and FIG. 5(b). Accordingly, the beam receiver 6 can detect the beams $L_1-L_2$ incident within the incident angle of $\theta a+\Theta c$ to $-\theta a-\theta c$. The beam receivable angle $\theta$ of the beam receiver 6 therefore becomes $\theta=2\theta a+2\theta c$ as shown in FIG. 4. If the beam receiving element groups $7a$ and $7b$ were disposed to face in the front direction instead of facing outwardly, the beam receivable angle would be $\theta=2\theta a$. It will be understood that the beam receivable angle obtainable by the arrangement of the illustrated example is wider by $2\theta c$ than the arrangement in which the beam receiving element groups $7a$ and $7b$ face straight ahead. The beams $L_1'+L_2'$ incident within an incident angle of $\theta d$ ($=\theta a-\theta c$) to $-\theta d$ ($=-\theta a+\theta c$) with respect to the front direction N are detected by the beam receiving element groups $7a$ and $7b$ simultaneously. These beam receiving element groups $7a$ and $7b$ outputs upon detection of the incident beam, signals $e_1$ and $e_2$ representative of detection of the beam. The hoods $18a$ and $18b$ are made of such length that the beam $L_1$ or $L_2$ incident within the angle $\theta a+\theta c$ or $-\theta a-\theta c$ will reach the beam receiving element groups $7a$ and $7b$.

Filters 14 and 14' are disposed in front of the beam receiving element groups $7a$ and $7b$ are secured at one end thereof to the corresponding hoods $18a$ and $18b$ and at the other end to the support plate 19. These filters 14 and 14' function to eliminate a harmful beam.

Figure 6:
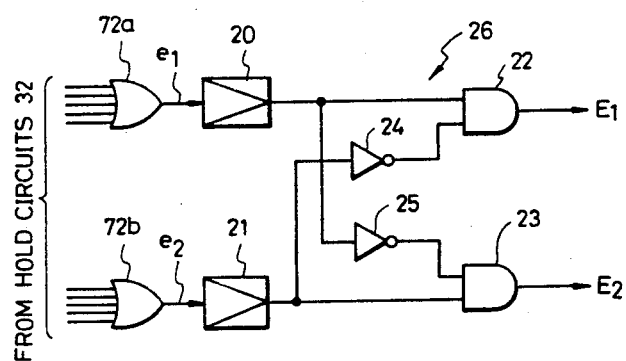
FIG. 6 is a block diagram showing an example of a beam receiver tracing signal process circuit.

FIG. 6 shows an example of construction of a signal processing circuit 26. The signal representative of receipt of the laser beam from the beam receiving element group $7a$ is applied to an OR gate $72a$. The OR gate $72a$ outputs the signal $e_1$ when the laser beam is struck upon any element of the beam receiving element group $7a$. The signal representative of receipt of the laser beam from the beam receiving element group $7b$ is applied to an OR gate $72b$. The OR gate $72b$ outputs the signal $e_2$ when the laser beam is struck upon any element of the beam receiving element group $7b$. The signals $e_1$ and $e_2$ are applied to amplifiers 20 and 21 of the circuit 26 and are applied to AND gates 22 and 23 and inverters 24 and 25 after amplification.

If an incident beam L is within the incident angle $\theta a+\theta c$ to $\theta a-\theta c$, the beam receiving element group $7a$ only receives this beam and outputs the signal $e_1$. In this case, the beam receiving element group $7b$ cannot receive the beam L so that the signal $e_2$ is 0. In this case, the AND gate 22 outputs a tracing signal $E_1$. If the incident beam L is within the incident angle $-\theta a-\theta c$ to $-\theta a+\theta c$, the beam receiving element group $7b$ only receives this beam and outputs the signal $e_2$. In this case, the beam receiving element $7a$ cannot receive the beam L so that the signal $e_1$ is 0 and the AND gate 23 outputs a tracing signal $E_2$. If the incident beam L is within the incident angle $\theta a-\theta c$ to $-\theta a+\theta c$, both the beam receiving element groups $7a$ and $7b$ output the signals $e_1$ and $e_2$. Accordingly, neither the AND gate 22 nor 23 outputs the tracing signal. The tracing signals $E_1$ and $E_2$ are outputted when the beam L is received within the incident angle $\theta a+\theta c$ to $\theta a-\theta c$ and $-\theta a-\theta c$ to $-\theta a+\theta c$ as shown in FIGS. 5(c) and 5(d).

The tracing signals $E_1$ and $E_2$ are applied to the tracing motor 5 as shown in FIG. 2 via a motor driving circuit 70. The beam receiver 6 is rotated in the direction of arrow A in FIG. 3(a) while the signal $E_1$ is being applied to the tracing motor 5 whereas it is rotated in the direction of arrow B while the signal $E_2$ is being applied to the motor 5. The beam receiver 6 therefore always follows the incident direction of the beam L.

Figure 7:
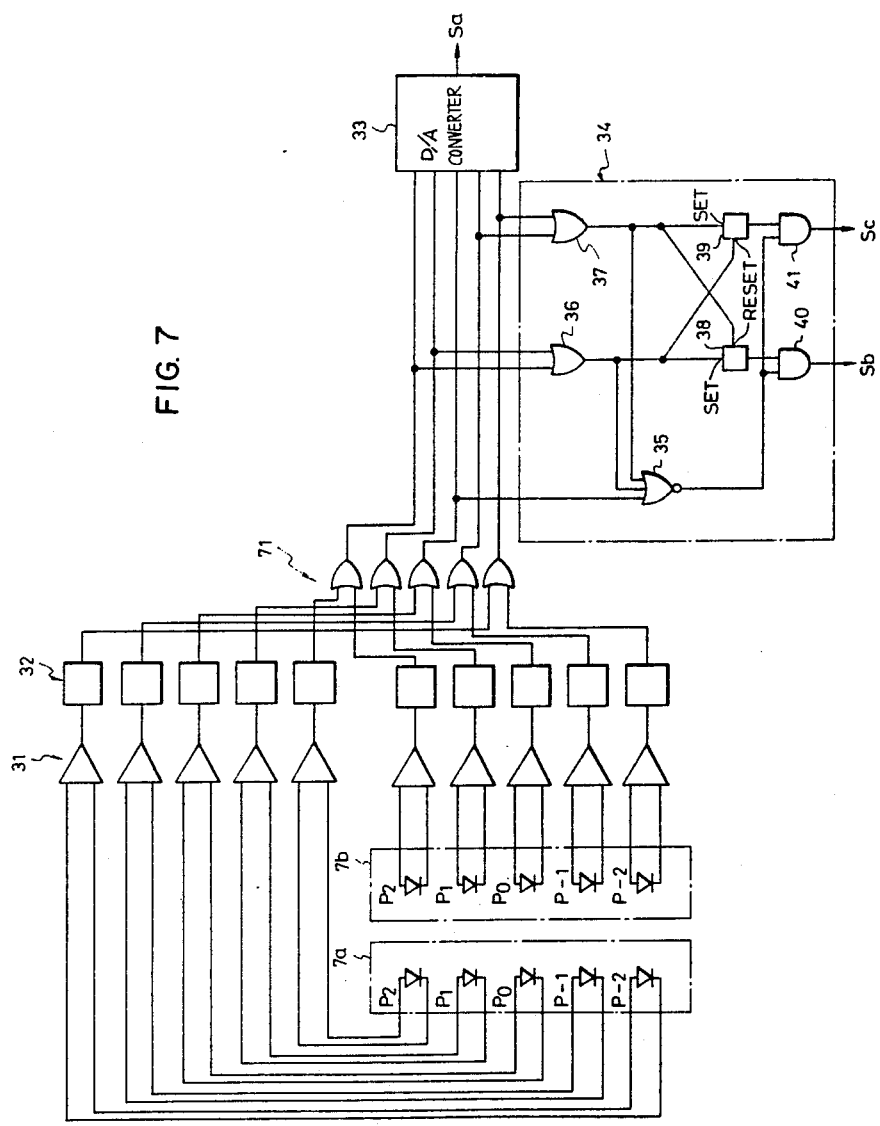
FIG. 7 is a block diagram showing an example of a beam deviation detection circuit.

FIG. 7 shows an example of construction of a beam deviation detection circuit 34. In the illustrated example, the beam receiving element groups $7a$ and $7b$ respectively have five beam receiving elements arranged vertically. The following description however is applicable to a case where more beam receiving elements are provided. The five beam receiving elements are designated by reference characters $P_2$, $P_1$, $P_0$ (center position), $P_{-1}$ and $P_{-2}$, respectively.

Figure 8:
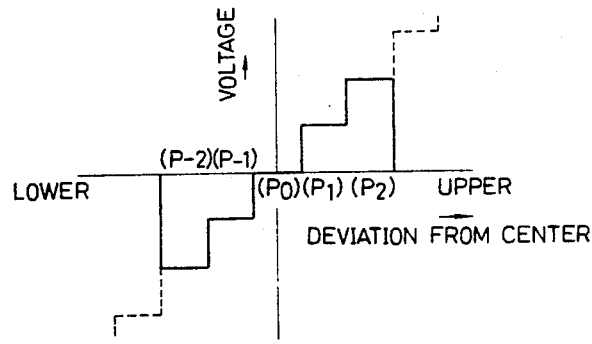
FIG. 8 is a graphic diagram showing relationship between the height of receiving beam by the beam receiver shown in FIGS. 3(a) and 3(b) and its output signal.

As shown in FIG. 7, the beam receiving elements $P_2$ through $P_{-2}$ are connected to hold circuits 32 via amplifiers 31. The hold circuits 32 hold the beam detection signals for a predetermined short interval of time, as described before. Since the beam projector 1 is rotating, the beam receiver 6 receives the laser beam L only intermittently and this is apparently undesirable for controlling purposes. For this reason, the hold circuits are employed to change the beam detection signals into continuous signals. The beam detection signal outputted from the hold circuits 32 are applied to an OR gate group 71 and the signals corresponding to the beam receiving element of the same height are applied together to a digital to-analog converter 33 where they are converted to an analog signal Sa corresponding to the height at which the beam has been received. For example, this signal Sa is O(V) if the beam is received by the centrally located beam receiving element $P_0$ as shown in FIG. 8. If the beam is received by a beam receiving element located above the central element $P_0$, the value of the signal Sa increases in a positive direction whereas if the beam is received by a beam receiving element located below the central element $P_0$, the value of the signal Sa increases in a negative direction. FIG. 8 is a graph made with respect to the case where five beam receiving elements $P_2-P_{-2}$ are provided. If more beam receiving elements are provided, the value of signal Sa increases (or decreases) stepwisely as indicated by a dotted line in FIG. 8.

Figure 14:
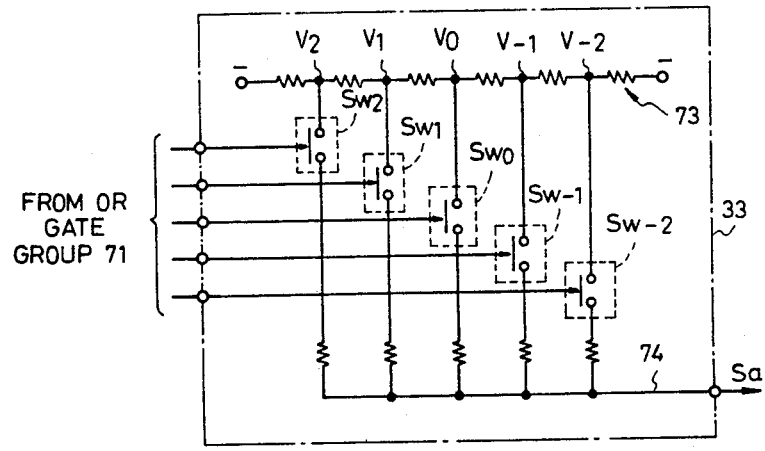
FIG. 14 is a circuit diagram showing an example of a digital-to-analog converter circuit shown in FIG. 2.

As the digital-to-analog converter 33 for obtaining the above described signal Sa, one as shown in FIG. 14 is conventiently employed. The digital-to-analog converter 33 shown in FIG. 14 includes a resistance dividing circuit 73 being supplied with a positive voltage at one end thereof and a negative voltage at the other end thereof and having voltage dividing points $V_2$-$V_{-2}$ corresponding to the beam receiving elements $P_2$-$P_{-2}$, switches $SW_2$-$SW_{-2}$ for taking out voltages at the respective voltage dividing points $V_2$-$V_{-2}$ and an output line 74 for transmitting the voltages taken out of the switches $SW_2$-$SW_{-2}$. By switching on of the switches $SW_2$-$SW_{-2}$ in response to the beam detection signals supplied by the beam receiving elements $P_2$-$P_{-2}$ through the OR gate group 71, a voltage corresponding to the beam receiving position of the beam receiver 6 is delivered on the output line 74. According to the above described arrangement, if two or more beam receiving elements have received the beam, a mean value of the voltages corresponding to the respective beam receiving elements which have received the beam is obtained.

Referring back to FIG. 7, the beam deviation detection circuit 34 is provided for detecting deviation of the laser beam L from the beam receiver 6. If the beam L has deviated from the beam receiver 6, the signal Sa becomes 0(v) and this will result in disabling of the control operation. For preventing this situation, the direction of deviation (i.e., upward deviation or downward deviation) is memorized by the beam deviation detection circuit 34.

Beam detection signals from the beam receiving elements $P_2$ and $P_1$ of the beam receiver 6 are applied to an OR gate 36 of the beam deviation detection circuit 34. Beam detection signals from the beam receiving elements $P_{-2}$ and $P_{-1}$ are applied to an OR gate 37. A beam detection signal from the beam receiving element $P_0$ and output signals from the OR gates 36 and 37 are applied to a NOR gate 35. The beam deviation detection circuit 34 includes two flip-flop circuits 38 and 39. The flip-flop circuit 38 is set by an output "1" of the OR gate 36 to produce an output "1" and reset by an output "1" of the OR gate 37 to produce an output "0". The flip-flop circuit 39 is set by an output "1" of the OR gate 37 to produce an output "1" and reset by an output "1" of the OR gate 36 to produce an output "0". The outputs of the flip-flop circuit 38 and the NOR gate 35 are applied to an AND gate 40. The outputs of the flip-flop circuit 39 and the NOR gate 35 are applied to an AND gate 41.

If the beam receiving element $P_1$ or $P_2$ has received the beam, the outputs of the OR gates 36 and 37 are turned to "1" and "0" and the outputs of the flip-flop circuits 38 and 39 thereby are turned to "1" and "0". If the beam receiving element $P_{-1}$ or $P_{-2}$ has received the beam, the outputs of the OR gates 36 and 37 are turned to "0" and "1" and the outputs of the flip-flop circuits 38 and 39 are turned to "0" and "1". If the beam receiving element $P_0$ has received the beam, the outputs of the OR gates 36 and 37 are "0" and the flip-flop circuits 38 and 39 maintain their previous states. While the outputs of the flip-flop circuits 38 and 39 change in accordance with the beam receiving position, the output of the NOR gate 35 is "0" if the laser beam L is struck upon either one of the beam receiving elements $P_2$-$P_{-2}$ so that neither the AND gate 40 nor 41 produces an output signal.

Description will now be made about a case where the laser beam L has deviated upwardly. The laser beam L passes the beam receiving element $P_2$ when it is deviated upwardly and, accordingly, the outputs of the flip-flop circuits 38 and 39 remain to be "1" and "0". If the beam has not come out of the beam receiver yet, the output of the NOR gate 35 is "0" and the outputs of the AND gates 40 and 41 are "0". When the beam has come out of the beam receiver, no beam receiving element receives the beam so that the output of the NOR gate 35 rises to "1". Since the outputs of the flip-flop circuits 38 and 39 remain to be "1" and "0", the AND gate 40 produces an output "1". Alternatively stated, the output Sb of the AND gate 40 is a detection signal indicating that the laser beam has deviated upwardly out of the beam receiver. Likewise, when the laser beam L has deviated downwardly out of the beam receiver, the AND gate 41 produces an output "1", for the outputs of the flip-flop circuits 38 and 39 remain to be "0" and "1". This output Sc of the AND gate 41 is a detection signal indicating that the laser beam has deviated downwardly out of the beam receiver.

The signals Sb and Sc outputted by the circuit shown in FIG. 7 are applied to the processing circuit 42 shown in FIG. 2.

The processing circuit 42, the pulse width modulation circuit 43, the lift cylinder drive circuit 44 and the lift cylinder 11 are constructed for example as shown in FIG. 9.

In the processing circuit 42 shown in FIG. 9, the input signals Sa, Sb and Sc are respectively applied to an addition circuit 83 via amplifiers 80, 81 and 82. The addition circuit 83 adds the signals Sa, Sb and Sc together for producing a control signal used for controlling the level of the blade so that it will read a predetermined level. Since two or more of the signals Sa, Sb and Sc are not outputted simultaneously, the addition circuit 83 actually outputs the signals Sa, Sb and Sc individually. Since the signals Sb and Sc must function to drive the blade 3 in opposite directions, the signal Sc is outputted in a polarity which is opposite to that of the signal Sb. The output of the addition circuit 83 is applied to a work mode selection circuit 85 via a compensation circuit 84. The work mode selection circuit 85 is a circuit provided for selecting whether the blade level control in response to the signals Sa, Sb and Sc should be made during the forward movement or the reverse movement (i.e. whether the earth work should be made during the forward movement or the reverse movement). When the vehicle is in the moving direction in which the level control is to be made, the circuit 85 produces a signal corresponding to the signals Sa, Sb and Sc whereas when the vehicle is moving in the opposite direction (i.e., retiring to the initial position), the circuit 85 produces a signal for compulsorily lifting the blade 3. The operation of the circuit 85 will be described more fully later. For the time being, description will be made on the assumption that signals corresponding to the signals Sa, Sb and Sc are being produced.

Figure 15:
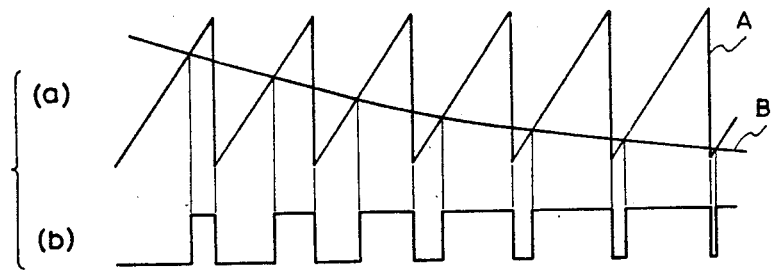
FIG. 15 is a graphic diagram showing relationship between input and output signals of a comparator shown in FIG. 9.
Figure 16:
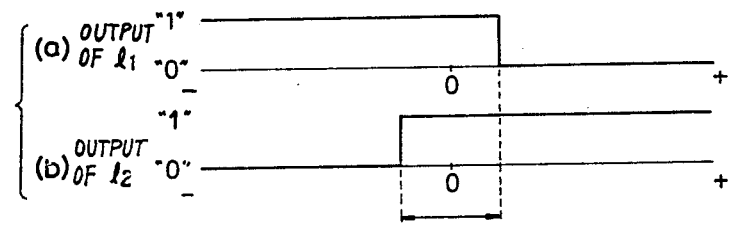
FIG. 16 is a graphical diagram showing relationship between input and output signals of an insensitive region generation circuit shown in FIG. 9.

The output of the processing circuit 42 is applied to the pulse width modulation circuit 43. In the pulse modulation circuit 43, an absolute value circuit 86 picks up an absolute value of the output signal of the processing circuit 85 and applies this absolute value to a comparator 87. The comparator 87 compares the absolute value with a saw-tooth wave signal generated by a saw-tooth wave generation circuit 88 and produces an output "1" when the saw-tooth wave signal is greater than the absolute value. Assume, for example, that the saw-tooth wave is one as shown by a solid line A in FIG. 15(a) and the signal representing the absolute value is one as shown by a solid line B in FIG. 15(a). The comparator 87 outputs a pulse having a pulse width corresponding to the signal representing the absolute value as shown in FIG. 15(b). The greater the magnitude of signal representing the absolute value, the narrower the pulse width of the pulse outputted by the comparator 87. As will be described later, the lift cylinder 11 is driven while this pulse is "0". As insensitive region generation circuit 89 is provided for keeping the blade 3 inoperative when the signal outputted by the processing circuit 82 is small, i.e. when the deviation of the beam receiving position from the center of the beam receiver 6 is small (when the level of the blade 3 is substantially at the present position). If the signal from the processing circuit 42 is in a positive region beyond the insensitive region, a signal "0" is provided on an output line $l_1$ (FIG. 16(a)). If the signal from the processing circuit 42 is in a negative region, a signal "0" is provided on an output line $l_2$ (FIG. 16(b)). If the signal from the processing circuit 42 is within the insensitive region, an output "1" is provided on both the output lines $l_1$ and $l_2$.

The lift cylinder drive circuit 44 comprises, for example, a logic circuit 92, a valve drive circuit 93 and a hydraulic circuit 94 as shown in FIG. 9.

In the hydraulic circuit 94, a manually operated valve 105 is provided to switch the lift cylinder 11 between expansion position (105B), contraction position (105A), hold position (105c) and float position (105D). The valve 105 is connected through a rod 106a to a cylinder portion 106b of an operation cylinder (hereinafter referred to as a slave cylinder) 106. The piston rod 106c of the slave cylinder 106 in turn is connected to a manual operation lever 107 for lifting and lowering the blade 3. A lock device 108 is provided for locking the operation lever 107 during the automatic controlling of the blade. The lock device 108 is interlocked with a blade manual-automatic control switch 100. When the operation lever 107 is locked (i.e. in the automatic mode), the switch 100 is switched on. A first electromagnetic valve 109 and a second electro-magnetic valve 110 connected on a hydraulic line between the slave cylinder 106 and a hydraulic pump $P_2$ are provided for driving the slave cylinder 106. These valves 109 and 110 are controlled by an output signal of the valve drive circuit 93. During the manual control of the blade 3, these valves 109 and 110 are switched to neutral positions 109c and 110A thereby hydraulically locking the slave cylinder 106 to a stroke position corresponding to the neutral position 105C of the manually operated valve 105. Accordingly, the operator can manually control the valve 105 to a desired valve position by operating the operation lever 107. During the automatic control of the blade 3, the operation lever 107 is locked by the lock device 108 so that the first electromagnetic valve 109 causes the cylinder portion 106b of the slave cylinder 106 to expand or contract relative to the piston rod 106c in accordance with valve positions 109A and 109B, thereby controlling the manually operated valve 105 to a predetermined valve position. The second electromagnetic valve 110 functions to assist an automatic return of the manually operated valve 105 by a spring 105E. When the valve 110 is switched to a position 110B, bottom and head side chambers thereof are directly connected to a reservoir $T_3$ thereby allowing the slave cylinder 106 to move freely.

In the logic circuit 92, the output signal on the output line $l_1$ of the insensitive region generation circuit 89 and the output of the comparator 87 are applied to a NOR gate 95. The output signal on the output line $l_2$ of the insensitive region generation circuit 89 and the output of the comparator 87 are applied to a NOR gate 96. Accordingly, the NOR gate 95 produces an output which is an inverted signal of the output of the comparator 87 (i.e. the signal whose pulse width increases its value as the absolute value of the output of the processing circuit 42 increases) when the signal on the output line $l_1$ is "0" (i.e. the beam receiving position has deviated upwardly and, accordingly, the blade 3 should be lifted). The NOR gate 96 produces an output which is an inverted signal of the output of the comparator 87 when the output signal on the output line $l_2$ is "0" (i.e. the beam receiving position has deviated downwardly and, accordingly, the blade 3 should be lowered). AND gates 98 and 99 to which the outputs of the NOR gates 95 and 96 are applied are provided for interrupting these outputs in order to prevent the lift cylinder 11 from being driven by these outputs during the manual operation. To one input terminal of the AND gates 98 and 99 is applied a voltage through a resistor 97 which is grounded through the manual-automatic control switch 100. Since the switch 100 is interlocked with the lock device 108, is switched off when the lock device 108 is in a locked state (i.e. the automatic control mode) and switched on when the lock device 108 is unlocked (i.e. the manual control mode), the level of the input signals on the one input terminals of the AND gates 98 and 99 are "1" in the automatic control mode so that the AND gates 98 and 99 gate out the outputs of the OR gates 95 and 96. During the manual control mode, the levels of the signals on the one input terminals of the AND gate 98 and 99 are "0" so that the outputs of the OR gates 95 and 96 are interrupted.

The output signals from the AND gates 98 and 99 are applied to solenoid valves 109Sb and 109Sa of the electromagnetic valve 109 via drivers 102 and 103 of the valve drive circuit 93 to switch the electromagnetic valve 109 to either direction and thereby lift or lower the blade 3. When, for example, the beam receiving position in the beam receiver 6 is high or the laser beam L has deviated upwardly (i.e. when the blade 3 is to be lifted), the signal Sa becomes of a positive polarity or the signal Sb is outputted and a pulse is outputted by the NOR gate 95 to switch the electromagnetic valve 109 to the position 109B. This in turn causes the slave cylinder 106 to be expanded to switch the electromagnetic valve 105 to the position 105A and thereby lift the blade 3. When the beam receiving position in the beam receiver 6 is low or the laster beam L has deviated downwardly (i.e., when the blade 3 is to be lowered), the signal Sa becomes of a negative polarity or the signal Sc is outputted and a pulse is outputted by the NOR gate 96 to switch the electromagnetic valve 109 to the position 109A. This causes the slave cylinder 106 to be contracted to switch the electromagnetic valve 105 to the position 105B and thereby lower the blade 3. A NOR gate 101 outputs a signal "1" when the outputs of the AND gates 98 and 99 are both "0", i.e., there is no necessity to lift or lower the blade 3. This output "1" of the NOR gate 101 energizes a solenoid 110s of the electromagnetic valve 110 through the driver 104, thereby switching the electromagnetic valve 110 to the position 110B. This releases the slave cylinder 106 to cause the manually operated valve 105 to be switched promptly to the neutral position 105C by action of a return spring 105E.

There is an insensitive region in the flow quantity characteristic of the electromagnetic valve 105. If the speed or waste time of the slave cylinder 106 changes, flow quantity to the lift cylinder 11 changes even if the pulse width of the signal applied to the electromagnetic valve 105 remains unchanged. The speed and waste time of the slave cylinder 106 vary with the engine revolution number and the hydraulic oil temperature. Accordingly, an engine revolution sensor 90 and an oil temperature meter 91 are provided in the pulse width modulation circuit 43 as shown in FIG. 9, and detected values of the sensor 90 and meter 91 are applied to the comparator 87 to compensate the pulse width of the output pulse (e.g. the level of the saw-tooth wave is raised or dropped as a whole).

The control for maintaining the level of the blade 3 at a constant level is conducted in the above described manner. Control for setting the level of the blade 3 at a desired level (the level of the blade 3 corresponds to the finishing level of the ground to be graded) is described below.

In the control to be described hereunder, the stroke of the cylinder 4 for lifting and lowering the beam receiver 6 is detected while a level setting signal is outputted by a level setter, and the stroke of the cylinder 4 is so controlled that deviation of the detection signal from the set signal will become 0. This arrangement is advantageous in a case when the operator has to lift the blade 3 to remove an overload applied to the blade 3 during the earth working because he can readily restore the blade 3 to the original level. Further, if there occurs an oil leakage in the cylinder 4, the blade 3 can be maintained at a set level.

Figure 10:
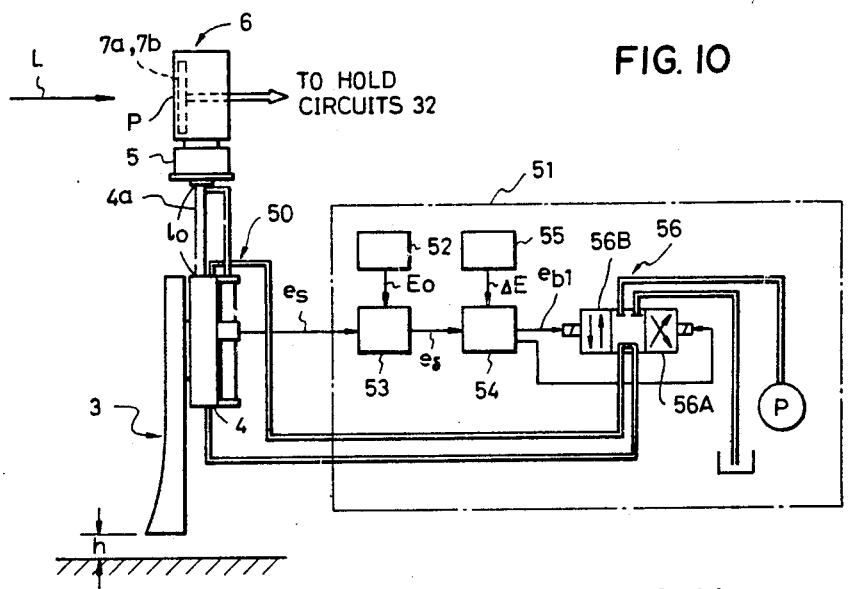
FIG. 10 is a block diagram showing an example of a device for controlling a blade level.

Referring to FIG. 10, a cylinder stroke detector 50 is provided in parallel to the cylinder 4. This detector 50 slides with the cylinder 4 to detect the stroke of the cylinder 4 and outputs a stroke signal $e_s$.

A finishing level setter 52 of the control unit 51 is provided for setting the finishing level, i.e., height h of the blade 3. This setter 52 produces a level set signal $E_0$. The setter 52 is disposed in an operation panel in front of the operator's seat so that the operator can set a desired level easily by a manual operation. The level set signal $E_0$ is so set that its value will decrease as the set level h increases.

A comparator 53 compares the signal $e_s$ with the signal $E_0$ and outputs a signal $E_\delta$ in accordance with the deviation.

A control circuit 54 compares the signal $e_\delta$ with an insensitive region $\Delta E$ of an insensitive region setter 55 and, when the signal $e_\delta$ is greater than the signal $\Delta E$, outputs a control signal $e_{b1}$ or $e_{b2}$ and applies it to an electromagnetic valve 56. The control signal $e_{b1}$ is a signal outputted when $e_s > E_0$, i.e. the detected value is greater than the set value. This signal $e_{b1}$ causes the electromagnetic valve 56 to be switched to a position 56B and thereby causing the cylinder 4 to be contracted to lower the beam receiver 6. The control signal $e_{b2}$ is a signal outputted when $e_s < E_0$, i.e. the detected value is smaller than the set value. The signal $e_{b2}$ causes the electromagnetic valve 56 to be switched to a position 56A and thereby causing the cylinder 4 to be expanded to lift the beam receiver 6.

Assume that the beam receiver 6 is receiving the laser beam L at the central position, the height of the blade 3 is $h_0$, the stroke of the cylinder 4 is $l_0$, the set signal at this blade height $h_0$ is $E_0$, the stroke signal is $e_{s0}$, the deviation $E_{\delta 0}$ is $e_{a0} < \Delta E$ and neither the control signals $e_{b1}$ nor $e_{b2}$ is being outputted. If an overload is applied to the blade 3 during an earth leveling work under the above described conditions, the operator sets the level setter 52 to a position $h_1$ which is higher than the blade height $h_0$. A set signal $E_1 (< E_0)$ corresponding to the set position $h_1$ is outputted and the comparator 53 produces the direction signal $e_\delta$. The control circuit 54 produces the signal $e_{b1}$ if the signal $e_\delta$ becomes greater than the signal $\Delta E$. The electromagnetic valve 56 is switched to the position 56B in response to this signal $e_{b1}$ and the cylinder 4 is contracted. As the cylinder 4 is contracted, the value of the output signal of the stroke detector 50 decreases. When $E_0 - e_s = e_\delta < \Delta E$, the electromagnetic valve 56 stops its operation causing the cylinder 4 to be stopped at the stroke $l_1 (< l_0)$. During the above described level setting operation, the beam receiver 6 moves downwardly in accordance with the contraction of the cylinder 4 and the beam receiving position is shifted upwardly from the central position P of the beam receiving element groups 7a and 7b. Accordingly, the beam receiver 6 produces a beam detection signal corresponding to the change in the beam receiving position. The lift cylinder 11 is contracted in accordance with the beam detection signal and the blade 3 is lifted. As the beam receiving position of the beam receiver 6 coincides with the central position P, the level signal Sa becomes 0 and the lift cylinder 11 stops operation. Thus the blade 3 is stopped at the height which is the height $h_1 (> h_0)$ set by the level setter 52. In the above described manner, the blade 3 is lifted to reduce the load acting on the blade 3.

In the case where the blade height is to be restored to the original height $h_0$ after reducing the load, the level setter 52 is set at the original level position $h_0$. As the level setter is set at the level position $h_0$ and the signal $E_o$ is outputted, the cylinder 4 is expanded until the deviation $e_\delta$ from the stroke signal $e_s$ becomes smaller than the signal $\Delta E$. The beam receiver 6 is lifted in accordance with the expansion of the cylinder 4 and the beam receiving position therefore is relatively lowered so that a beam detection signal corresponding to the beam receiving position is outputted from the beam receiver 6. The lift cylinder 11 is driven by this beam detection signal and the blade 3 is lowered until the beam receiver 6 receives the beam at the central position P. When the beam receiving position has coincided with the central position P, the height of the blade 3 becomes $h_o$. The blade 3 is thus accurately restored to the initial height $h_o$.

In both of the above described cases, the expansion or contraction of the cylinder 4 and the lowering or lifting of the blade 3 are controlled substantially simultaneously.

If the stroke of the cylinder 4 becomes small due to oil leakage or the like reason, the signal $e_\delta$ is outputted and when this signal $e_\delta$ has exceeded the insensitive region signal $\Delta E$, the signal $e_{b2}$ is produced to actuate the electromagnetic valve 56 and thereby correct the cylinder stroke. Accordingly, the blade height can always be maintained at a desired value.

According to the invention, the blade height relative to the reference laser beam can be changed continuously and as desired. Accordingly, the earth working equipment incorporating the apparatus according to the invention can perform various works including preliminary pushing and preliminary finishing in addition to the conventional finishing work. The blade can be restored to the original height when the blade is once lifted for removing overload. Further, the stroke change caused by oil leakage in the beam receiver cylinder can be compensated so that the blade can always be maintained at a preset height.

According to the invention, the tilt angle of the blade 3 (an angle of inclination of the longitudinal direction of the blade 3 relative to a horizontal plane) can be controlled simultaneously.

The inclinometer 10 secured to the blade 3 (FIG. 1) detects the tilt angle of the blade 3.

Figure 11:
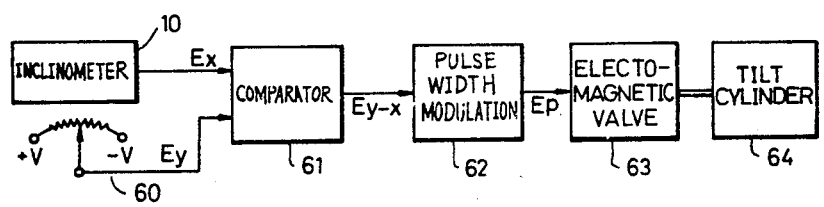
FIG. 11 is a block diagram showing an example of a tilting control.

Referring to FIG. 11, a tilt angle setter 60 is provided for setting the tilt angle at a desired angle by manipulation by the operator. The setter 60 produces a set signal $E_y$ of a polarity and magnitude corresponding to a set value. A comparator 61 compares the set signal $E_y$ with a detection signal $E_x$ and applies an error signal $E_{y-x}$ to a pulse width modulation circuit 62. The pulse width modulation circuit 62 produces a pulse width modulation signal $E_p$ having a pulse width corresponding to the magnitude of the error signal $E_{y-x}$ and the same polarity as the error signal $E_{y-x}$. An electromagnetic valve 63 is driven by the signal $E_p$ during an interval of time corresponding to the pulse width of the signal $E_p$ and in the direction of the polarity of the signal $E_p$. If the difference between the signals $E_y$ and $E_x$ is larger, the interval of time during which the electromagnetic valve 63 is driven is long, and vice versa. If the difference between the signals $E_y$ and $E_x$ is 0, the electromagnetic valve 63 is not driven at all. A tilt cylinder 64 is driven in accordance with the operation of the electromagnetic valve 63 so that the tilt angle of the blade 3 is so controlled that it will become equal to the value set by the tilt angle setter 60.

Figure 12:
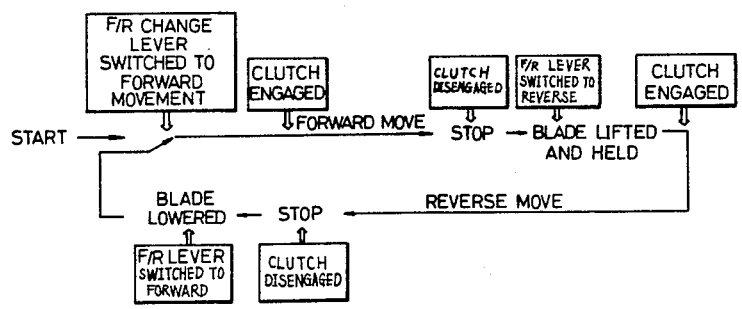
FIG. 12 is a flow chart schematically showing one cycle of a full automatic control operation according to the invention.

According to the invention, the operator's work is simplified by controlling the level of the blade 3 by the system described above. In addition, switching between start and stop of the above described control during the work time is automatically performed and a full-automatic earth work thereby is accomplished. This automatic implementation and stop of the blade control is effected in a manner as shown in FIG. 12. According to this system, the various controls concerning the blade 3 are automatically started or stopped in accordance with forward and reverse movement of the earth working equipment.

Referring to FIG. 12, if a forward-reverse change lever is set at a forward position in a work start position, this brings about a mode in which the above described controls can be implemented. As the clutch is engaged and the equipment moves forwardly, the earth work is effected by implementing the above described controls. When the equipment has reached an end of the work ground, the clutch is disengaged and the forward movement of the equipment is stopped. Then the change lever is switched to a reverse position. This releases the equipment from all of the controls and besides the blade 3 is compulsorily lifted. The clutch is engaged again and the equipment moves reversely toward the place where it started. When the equipment has reached near the starting point, the clutch is disengaged and the equipment is stopped. Then, the change lever is switched again to the forward position and the above described earth working process is reiterated.

The foregoing description has been made with reference to a case where the earth work is done during the forward movement and the blade 3 is compulsorily lifted during the reverse movement. There will however be a case where the earth work is conveniently done during the reverse movement. In such a case, the relation between the forward and reverse movements of the equipment and the start and stop of the controls may be made opposite to the first described process.

In the case of conducting the earth work during the forward movement, the equipment may be introduced in the mode in which the controls can be implemented when the change lever is switched from the reverse position (i.e. release of the controls) to a neutral position. By this arrangement, preparation for the earth work can be promptly completed.

FIG. 13 shows an example of the work mode selection circuit 85 shown in FIG. 9. The work mode selection circuit 85 receives a signal from a compensation circuit 84 and a blade lifting command signal for compulsorily lifting the blade 3 applied from a battery 111 through a variable resistor 112 and utilizes one of these input signals as a control signal for controlling the blade 3 in accordance with the forward and reverse movements of the equipment 2. A switch 65 is provided for switching the work mode between a mode in which the control according to the above described laser levelling system is conducted during the forward movement and the control according to the blade lifting command is conducted during the reverse movement and a mode in which the controls are conducted in an opposite way. In the example shown in FIG. 13, if the switch 65 is switched to the side a, the signal for the laser levelling control is delivered on a line $L_1$ whereas the blade lifting command signal is delivered on a line $L_2$. If the switch 65 is switched to the side b, the blade lifting command signal is delivered on the line $L_1$ and the signal for the laser levelling control is delivered on the line $L_2$. The line $L_1$ is connected to a contact c of a switch 66 and the line $L_2$ is connected to a contact d of the switch 66. The switch 66 selects a signal used for the forward or reverse movement of the equipment 2 and is switched in accordance with the operation of the change lever 67. For the forward movement, for example, the switch 66 is connected to the contact c and for the reverse movement the switch 66 is connected to the contact d. Accordingly, either one of the signal for the laser levelling control or the blade lifting command signal is transmitted to the pulse width modulation circuit 43.

Assume now that the switch 65 is switched to the contact a. During the forward movement (i.e. the switch 66 is switched to the contact c), the earth work is conducted by controlling the blade 3 according to the laser levelling system whereas during the reverse movement the blade 3 is automatically and compulsorily lifted. If the switch 65 is switched to the contact b, the blade 3 is automatically lifted during the forward movement and the earth work is conducted by the laser levelling system during the reverse movement.

In the above described example compulsory lifting of the blade 3 is effected by releasing the blade control by the laser levelling system and the signal used exclusively for lifting the blade is applied. This arrangement, however, is merely exemplary and the scope of the invention is not limited to it. If the set value of the level setter 52 shown in FIG. 10 is compulsorily changed (i.e. reduced) in accordance with switching of the change lever 67, the laser levelling control need not be released and the exclusive signal for lifting the blade 3 is not required.

What is claimed is:

1. An automatic control system for maintaining the blade of an earthworking device in a predetermined vertical relationship to a reference laser beam, said system comprising:

a beam receiver coupled to the blade, said beam receiver providing a beam detection signal corresponding to a vertical position on the beam receiver at which the reference laser beam is received and to an incident angle of the reference laser beam, wherein said beam receiver includes at least two beam receiving element groups angled outwardly with respect to each other;

main control means for controlling the position of the blade in response to said beam detection signal so that the vertical position at which the laser beam is received will correspond to a preset position;

automatic tracing means for controlling the turning of the beam receiver in response to the beam detection signal to thereby control the direction of the beam receiver, wherein said automatic tracing means comprises a logical circuit which can receive a first signal from one of said beam receiving element groups and a second signal from the other of said beam receiving element groups and delivers no output when it has received both the first and second signals, a right turn signal when it has received the first signal only and a left turn signal when it has received the second signal only;

beam deviation means for detecting an upward or downward deviation of the beam receiver with respect to the laser beam; and blade control means for moving the blade upward when the beam receiver has deviated downwardly with respect to the laser beam and downward when the beam receiver has deviated upwardly with respect to the laser beam, to thereby enable the beam receiver to receive the laser beam again.

2. An automatic control system as defined in claim 1 wherein said automatic tracing means further includes a motor for rotating the beam receiver and a motor driving circuit for driving said motor in one direction or another in response to said right turn and left turn signals.

3. An automatic control system for maintaining the blade of an earthworking device in a predetermined relationship to a reference laser beam, said system comprising:

a beam receiver coupled to the blade, said beam receiver providing a beam detection signal correponding to a vertical position on the beam receiver at which the reference laser beam is received and to an incident angle of the reference laser beam, wherein said beam receiver includes at least one beam receiving element group having an upper element and a lower element;

main control means for controlling the position of the blade in response to said beam detection signal so that the vertical position at which the laser beam is received will correspond to a preset position;

automatic tracing means for controlling the turning of the beam receiver in response to the beam detection signal to thereby control the direction of the beam receiver;

beam deviation means for detecting an upward or downward deviation of the beam receiver with respect to the laser beam, wherein said beam deviation means comprises:

a NOR gate which outputs a signal "1" when none of said beam receiving elements receives the beam;

a first flip-flop which is set by a signal from said upper beam receiving element when said upper beam receiving element has received the beam;

a second flip-flop which is set by a signal from said lower beam receiving element when said lower beam receiving element has received the beam, said first flip-flop being reset by the signal from the lower beam receiving element and said second flip-flop being reset by the signal from the upper beam receiving element;

a first AND gate which is enabled upon receiving the output of said NOR gate and a set output of said first flip-flop, said first AND gate providing an upward deviation signal; and a second AND gate which is enabled upon receiving the output of said NOR gate and a set output of said second flip-flop, said second AND gate providing a downward deviation signal; and blade control means for moving the blade upward when the beam receiver has deviated downwardly with respect to the laser beam and downward when the beam receiver has deviated upwardly with respect to the laser beam, to thereby enable the beam receiver to receive the laser beam again.

4. An automatic control system for maintaining the blade of an earthworking device in a predetermined relationship to a reference laser beam, said system comprising:

a beam receiver coupled to the blade, said beam receiver providing a beam detection signal corresponding to a vertical position on the beam receiver at which the reference laser beam is received and to an incident angle of the reference laser beam;

main control means for controlling the position of the blade in response to said beam detection signal so that the vertical position at which the laser beam is received will correspond to a preset position, wherein said main control means comprises:

a hold circuit for temporarily holding the beam detection signal from said beam receiver;

a digital-to-analog converter for receiving the output of said hold circuit and generating a signal of a level corresponding to the vertical position in which the beam is received;

a processing circuit for receiving the output of said digital-to-analog converter and generating a signal of a polarity which is 0 at a central vertical position in which the beam is received, is positive in a vertical beam receiving position above the central position and is negative in a vertical beam receiving position below the central position and of a level corresponding to the deviation of the beam from the central position;

a pulse width modulation circuit for receiving the output of said processing circuit and delivering out a pulse of a polarity corresponding to the input and of a pulse width corresponding to the level of the input;

a lift device for moving the blade; and a drive control circuit for driving the lift device during a period of time corresponding to the pulse width and in the direction of the polarity of said pulse;

automatic tracing means for controlling the turning of the beam receiver in response to the beam detection signal to thereby control the direction of the beam receiver;

beam deviation means for detecting an upward or downward deviation of the beam receiver with respect to the laser beam; and blade control means for moving the blade upward when the beam receiver has deviated downwardly with respect to the laser beam and downward when the beam receiver has deviated upwardly with respect to the laser beam, to thereby enable the beam receiver to receive the laser beam again.

5. An automatic control system for maintaining the blade of an earthworking device in a predetermined relationship to a reference laser beam, said system comprising:

a beam receiver coupled to the blade, said beam receiver providing a beam detection signal corresponding to a vertical position on the beam receiver at which the reference laser beam is received and to an incident angle of the reference laser beam;

main control means for controlling the position of the blade in response to said beam detection signal so that the vertical position at which the laser beam is received will correspond to a preset position;

an expandable support actuator for coupling the beam receiver to the blade;

beam receiver height control means for expanding or contracting the actuator in accordance with a desired grading height of the blade, wherein said beam receiver height control means comprises:

a sensor for detecting the position of said actuator;

a grading level setter for outputting a signal of a value corresponding to a desired grading level;

a comparator for producing a differential signal between the output of said sensor and the output of said grading level setter;

an insensitive region setter for producing an insensitive region signal; and a control circuit for controlling lifting or lowering of said actuator when the differential signal is larger than the insensitive region signal;

automatic tracing means for controlling the turning of the beam receiver in response to the beam detection signal to thereby control the direction of the beam receiver;

beam deviation means for detecting an upward or downward deviation of the beam receiver with respect to the laser beam; and blade control means for moving the blade upward when the beam receiver has deviated downwardly with respect to the laser beam and downward when the beam receiver has deviated upwardly with respect to the laser beam, to thereby enable the beam receiver to receive the laser beam again.

6. An automatic control system for maintaining the blade of an earthworking device in a predetermined relationship to a reference laser beam, said system comprising:

a beam receiver coupled to the blade, said beam receiver providing a beam detection signal corresponding to a vertical position on the beam receiver at which the reference laser beam is received and to an incident angle of the reference laser beam;

main control means for controlling the position of the blade in response to said beam detection signal so that the vertical position at which the laser beam is received will correspond to a preset position;

automatic tracing means for controlling the turning of the beam receiver in response to the beam detection signal to thereby control the direction of the beam receiver, beam deviation means for detecting an upward or downward deviation of the beam receiver with respect to the laser beam; and blade control means for moving the blade upward when the beam receiver has deviated downwardly with respect to the laser beam and downward when the beam receiver has deviated upwardly with respect to the laser beam, to thereby enable the beam receiver to receive the laser beam again; and a work mode selection circuit for interrupting blade control by the reference laser beam during either the forward movement or reverse movement of the device and delivering a blade lifting command signal for lifting the blade to a desired level, thereby lifting the blade to and maintaining it at the desired level, wherein said work mode selection circuit comprises a selection switch for selecting whether the blade is lifted and maintained in the lifted position during the forward movement of the device or during the reverse movement thereof, and a control switch for causing the signal from said beam receiver to be interrupted during the selected mode of the movement of the equipment and the blade lifting command signal to be outputted as the blade control signal.

* * * * *